United States Patent
Li

(10) Patent No.: US 10,742,378 B2
(45) Date of Patent: *Aug. 11, 2020

(54) METHOD FOR TRANSMITTING PILOT SIGNAL, METHOD FOR RECEIVING PILOT SIGNAL, BASE STATION, AND USER EQUIPMENT

(71) Applicant: Huawei Technologies Co., Ltd., Shenzhen, Guangdong (CN)

(72) Inventor: Yuanjie Li, Shanghai (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,708

(22) Filed: Aug. 3, 2018

(65) Prior Publication Data
US 2018/0343095 A1 Nov. 29, 2018

Related U.S. Application Data

(63) Continuation of application No. 14/802,524, filed on Jul. 17, 2015, now Pat. No. 10,044,481, which is a
(Continued)

(51) Int. Cl.
*H04L 5/00* (2006.01)

(52) U.S. Cl.
CPC .......... *H04L 5/0051* (2013.01); *H04L 5/0023* (2013.01); *H04L 5/0026* (2013.01); *H04L 5/0007* (2013.01)

(58) Field of Classification Search
CPC ............ H04W 52/367; H04W 72/0446; H04L 5/0051; H04L 27/00; H04B 1/18
See application file for complete search history.

(56) References Cited

U.S. PATENT DOCUMENTS

| 2011/0274067 | A1 | 11/2011 | Lee et al. |
| 2011/0310825 | A1* | 12/2011 | Hu ........................ H04L 5/0017 370/329 |

(Continued)

FOREIGN PATENT DOCUMENTS

| CN | 102577156 A | 7/2012 |
| CN | 102916920 A | 2/2013 |

(Continued)

OTHER PUBLICATIONS

LG Electronics, "Handling the Conflict of PSS/SSS and DM-RS in NCT," 3GPP TSG RAN WG1#69, Agenda Item 7.2.2.2, Prague, Czech Republic, May 2012, R1-122275, 6 pages.
(Continued)

*Primary Examiner* — Iqbal Zaidi
(74) *Attorney, Agent, or Firm* — Fish & Richardson P.C.

(57) ABSTRACT

Embodiments of the present application provide a method for transmitting a pilot signal, a method for receiving a pilot signal, a base station, and a user equipment. The method for transmitting the pilot signal includes: determining a physical resource block pair which is used for carrying a user-dedicated pilot signal, where first five orthogonal frequency division multiplexing (OFDM) symbols in a first time slot of the physical resource block pair include all resource elements used for carrying the user-dedicated pilot signal; and transmitting the physical resource block pair which is used for carrying the user-dedicated pilot signal. The method for transmitting the pilot signal, the method for receiving the pilot signal, the base station, and the user equipment according to embodiments of the present application can improve communication data demodulation performance of a user equipment.

8 Claims, 9 Drawing Sheets determining a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal — 101 transmitting the physical resource block pair which is used for carrying the user-dedicated pilot signal — 102

Related U.S. Application Data continuation of application No. PCT/CN2013/070718, filed on Jan. 18, 2013.

(56) References Cited

U.S. PATENT DOCUMENTS

| | | | | |
|---|---|---|---|---|
| 2013/0094479 | A1* | 4/2013 | Park | H04L 5/0057 370/336 |
| 2015/0085822 | A1 | 3/2015 | Ko et al. | |
| 2016/0149741 | A1* | 5/2016 | Fujikura | H04B 1/18 375/343 |
| 2016/0204922 | A1 | 7/2016 | Li et al. | |

FOREIGN PATENT DOCUMENTS

| | | |
|---|---|---|
| WO | 2010/071311 A2 | 6/2010 |
| WO | 2013/025551 A1 | 2/2013 |

OTHER PUBLICATIONS

LG Electronics, "Handling the Conflict of PSS/SSS and DM-RS in NCT," 3GPP TSG RAN WG1#71, Agenda Item 6.3.1.1, New Orleans, USA, Nov. 2012, R1-124989, 6 pages.

LG Electronics, "Performance Evaluation of DMRS Pattern for New Carrier Type," 3GPP TSG RAN WG1 Meeting #71, Agenda Item 6.3.1.1, New Orleans, USA, Nov. 2012, R1-124990, 10 pages.

Samsung, "Details on Synchronization Signal Mapping for the New Carrier Type," 3GPP TSG TRAN WG1 Meeting #69, Agenda Item 7.2.2.2, Prague, Czech Republic, May 2012, R1-122226, 3 pages.

Nokia Siemens Networks et al., "DM RS for Additional Special Subframe Configuration," 3GPP TSG RAN WG1#69, Agenda Item 7.7.2, Prague, Czech Republic, May 2012, R1-122430, 3 pages.

Zte, "Further Study on RS and Transmission Mode for Additional Special Subframe Configuration for LTE TDD," 3GPP TSG RAN WG1#69, Agenda Item 7.7.2, Prague, Czech Republic, May 2012, R1-122541, 4 pages.

\* cited by examiner

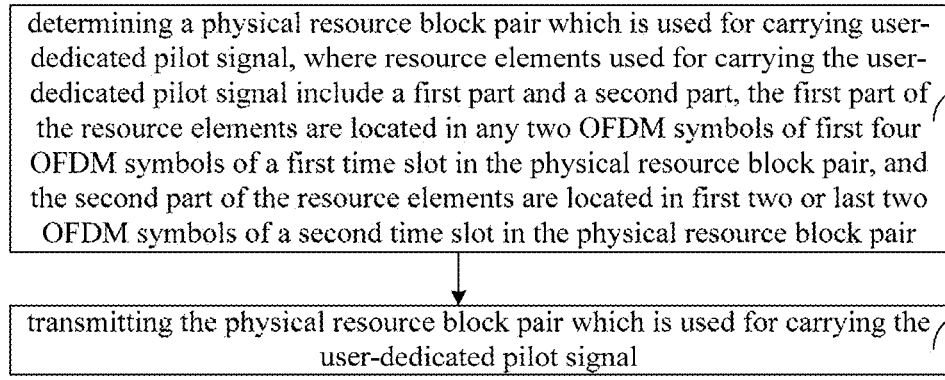

determining a physical resource block pair which is used for carrying user-dedicated pilot signal, where resource elements used for carrying the user-dedicated pilot signal include a first part and a second part, the first part of the resource elements are located in any two OFDM symbols of first four OFDM symbols of a first time slot in the physical resource block pair, and the second part of the resource elements are located in first two or last two OFDM symbols of a second time slot in the physical resource block pair ⟶ 201 transmitting the physical resource block pair which is used for carrying the user-dedicated pilot signal ⟶ 202

FIG. 10

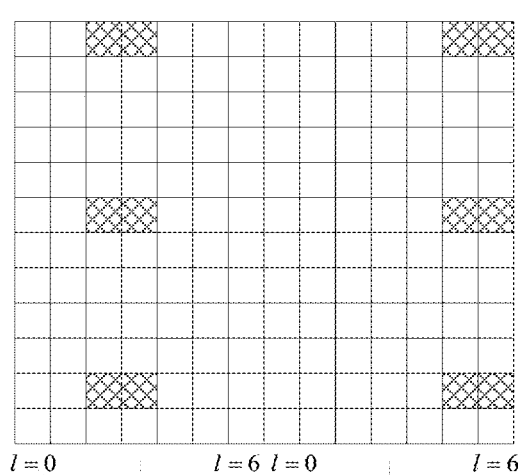

$l=0 \quad l=6 \; l=0 \quad l=6$

FIG. 11a

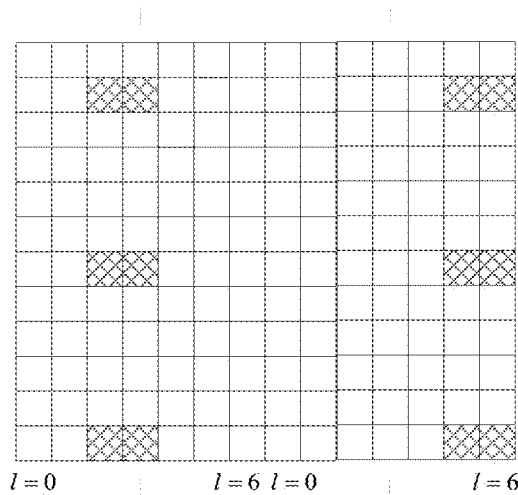

$l=0 \quad l=6 \; l=0 \quad l=6$

FIG. 11b

METHOD FOR TRANSMITTING PILOT SIGNAL, METHOD FOR RECEIVING PILOT SIGNAL, BASE STATION, AND USER EQUIPMENT

CROSS-REFERENCE TO RELATED APPLICATION

This application is a continuation of U.S. patent application Ser. No. 14/802,524 filed on Jul. 17, 2015 now U.S. Pat. No. 10,044,481, which is a continuation of International Application No. PCT/CN2013/070718 filed on Jan. 18, 2013. All of the afore-mentioned patent applications are hereby incorporated by reference in their entireties.

TECHNICAL FIELD

Embodiments of the present application relate to communication technologies and, in particular, to a method for transmitting a pilot signal, a method for receiving a pilot signal, a base station, and a user equipment.

BACKGROUND

In a third generation partnership project (3GPP) long term evolution (LTE) or LTE-advanced (LTE-A) system, downlink multiple access manners generally use an orthogonal frequency division multiple access (OFDMA) manner. In time, a length of a radio frame is 10 ms, including 10 subframes, each subframe is 1 ms, each subframe includes two time slots, and each time slot includes seven (when a normal cyclic prefix is used) or 6 OFDM symbols (when an extended cyclic prefix is used). In frequency axis, a radio frame consists of a plurality of subcarriers, and a subcarrier in an OFDM symbol is called a resource element (RE). Twelve subcarriers and a time slot form a resource block (RB).

Various data carried in a subframe is mapped by various physical channels divided in physical time frequency resources of the subframe. For instance, a physical downlink control channel (PDCCH for short), a cell common reference signal (CRS for short), and a physical downlink shared channel (PDSCH for short) and etc may be included. In existing LTE R10 and R11 systems, the subframe may be divided into two types approximately. One type is a normal subframe, for two situations regarding the extended cyclic prefix (CP for short) and the normal CP as described above, where the physical downlink control channel is provided in the first three or the first four symbols of the first time slot, common pilot is provided in the fourth or fifth symbol, and dedicated pilot is provided in the last two symbols, respectively. The other is a special subframe, for instance, which is configured in subframes 0 and 5 in the case of the normal CP is used, and in subframes 0, 4 and 7 in the case of the extended CP is used, where the dedicated pilot is not provided.

In a new LTE R11 version, a new carrier type (NCT for short) is provided, where the physical downlink control channel and the common pilot are not set any more. Instead, only the dedicated pilot, i.e. a user equipment (UE for short)-specified reference signal, is relied on for signal demodulation. The resource elements which was provided for the physical downlink control channel and the common pilot before in a physical resource block is used for transmitting downlink data or an enhanced physical downlink control channel. In a case of NCT, the transmitted special frame cannot be demodulated by a receiving device since there isn't a reference signal; while for a normal subframe, channel estimation quality at the receiving end will also be poor since the dedicated pilot is provided in the last two symbols of the first time slot. Thus, the existing dedicated pilot design is not adaptable to the new NCT scheme, which will affect communication data demodulation performance of a user equipment.

SUMMARY

Embodiments of the present application provide a method for transmitting a pilot signal, a method for receiving a pilot signal, a base station, and a user equipment, which are used to improve communication data demodulation performance of a user equipment.

In another aspect, embodiments of the present application provide a method for transmitting a pilot signal, including:

determining a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal; and transmitting the physical resource block pair which is used for carrying the user-dedicated pilot signal.

The first five OFDM symbols of the first time slot in the physical resource block pair include all the resource elements used for carrying the user-dedicated pilot signal, including:

the number of resource elements carrying the user-dedicated pilot signal at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying user-dedicated pilot signals at different antenna ports are located in different subcarriers or different OFDM symbols of the first five OFDM symbols in the physical resource block pair; or, the number of resource elements carrying the user-dedicated pilot signal at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The number of the resource elements carrying the user-dedicated pilot signals at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying user-dedicated pilot signals at different antenna ports are located in different subcarriers or different OFDM symbols of the first five OFDM symbols in the physical resource block pair, including:

for special subframes configured as 0 and 5 in a situation that a normal cyclic prefix CP is used, a user-dedicated pilot signal at each antenna is carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying user-dedicated pilot signals at different antenna ports are located in different subcarriers in the physical resource block pair.

The number of resource elements carrying the user-dedicated pilot signal at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair, including:

for special subframes configured as 0 and 4 in a situation that an extended CP is used, a user-dedicated pilot signal at each antenna port is carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying user-dedicated pilot signals at different antenna ports are located in different subcarriers in the physical resource block pair; or for a special subframe configured as 7 in a situation that an extended CP is used, user-dedicated pilot signals at each antenna port are carried in 4 resource elements in the physical resource block pair, the 4 resource elements are located in one OFDM symbol of first four OFDM symbols of the first time slot in the physical resource block pair in time domain, and are located in 4 subcarriers of the OFDM symbols in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The first five orthogonal frequency division multiplexing OFDM symbols of the first time slot in the physical resource block pair include all the resource elements used for carrying the user-dedicated pilot signals, including:

a user-dedicated pilot signal at the at least one antenna port is carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division; or a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The user-dedicated pilot signal at the at least one antenna port is carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division:

for special subframes configured as 0 and 5 in a situation that a normal CP is used, a user-dedicated pilot signal at the at least one antenna port is carried in 6 resource elements in the physical resource block pair, the 6 resource elements are located in a first and a second OFDM symbols, a first and a third OFDM symbols, or a second and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signal at the at least one antenna port is carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, user-dedicated pilot signals at different antenna ports carried in the same resource element are differentiated by the manner of code division, including:

for special subframes configured as 0 and 4 in a situation that an extended CP is used, a user-dedicated pilot signal at the at least one antenna port is carried in 8 resource elements in the physical resource block pair, the 8 resource elements are located in a first and a second OFDM symbols, a first and a third OFDM symbols, or a second and a third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division; or for a special subframe configured as 7 in a situation that an extended CP is used, a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The first five orthogonal frequency division multiplexing OFDM symbols of the first time slot in the physical resource block pair include all the resource elements used for carrying the user-dedicated pilot signal, including:

for special subframes configured as 0 and 5 in a situation that a normal CP is used, a user-dedicated pilot signal at the at least one antenna port is carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division; or for special subframes configured as 0 and 4 in a situation that an extended CP is used, a user-dedicated pilot signal at the at least one antenna port is located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Embodiments of the present application also provide another method for transmitting a pilot signal, including:

determining a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair; and transmitting the physical resource block pair which is used for carrying the user-dedicated pilot signal.

The first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

for a normal subframe in a situation that a normal cyclic prefix CP is used, the first part includes 6 resource elements, the first part of the resource elements are located in a second and a third OFDM symbols, or a third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in same three subcarriers in frequency domain, adjacent subcarriers in the same three subcarriers have an interval of 4 subcarriers; and for a normal subframe in a situation that an extended CP is used, the first part comprises 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

In a second aspect, embodiments of the present application provide a method for receiving a pilot signal, including:

receiving a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal; and extracting the user-dedicated pilot signal from the physical resource block pair.

The first five OFDM symbols of the first time slot in the physical resource block pair include all the resource elements used for carrying the user-dedicated pilot signal, including:

the number of resource elements carrying the user-dedicated pilot signal at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying user-dedicated pilot signals at different antenna ports are located in different subcarriers or different OFDM symbols of the first five OFDM symbols in the physical resource block pair; or, the number of resource elements carrying the user-dedicated pilot signal at each antenna port is 4, the 4 resource elements are located in one OFDM symbol out of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The number of the resource elements carrying the user-dedicated pilot signal at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying user-dedicated pilot signals at different antenna ports are located in different subcarriers or different OFDM symbols of the first five OFDM symbols in the physical resource block pair, including:

for special subframes configured as 0 and 5 in a situation that a normal cyclic prefix CP is used, a user-dedicated pilot signal at each antenna is carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying user-dedicated pilot signals at different antenna ports are located in different subcarriers in the physical resource block pair.

The number of resource elements carrying the user-dedicated pilot signal at each antenna port is 4, the 4 resource elements are located in one OFDM symbol of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair, including:

for special subframes configured as 0 and 4 in a situation that an extended CP is used, a user-dedicated pilot signal at each antenna port is carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying user-dedicated pilot signals at different antenna ports are located in different subcarriers in the physical resource block pair; or for a special subframe configured as 7 in a situation that an extended CP is used, a user-dedicated pilot signals at each antenna port is carried in 4 resource elements in the physical resource block pair, the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The first five orthogonal frequency division multiplexing OFDM symbols of the first time slot in the physical resource block pair include all the resource elements used for carrying the user-dedicated pilot signal, including:

a user-dedicated pilot signal at the at least one antenna port is carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division; or a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The user-dedicated pilot signal at the at least one antenna port is carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division:

for special subframes configured as 0 and 5 in a situation that a normal CP is used, a user-dedicated pilot signal at the at least one antenna port is carried in 6 resource elements in the physical resource block pair, the 6 resource elements are located in a first and a second OFDM symbols, a first and a third OFDM symbols, or a second and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signal at the at least one antenna port is carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, user-dedicated pilot signals at different antenna ports carried in the same resource element are differentiated by the manner of code division, including:

for special subframes configured as 0 and 4 in a situation that an extended CP is used, a user-dedicated pilot signal at the at least one antenna port is carried in 8 resource elements in the physical resource block pair, the 8 resource elements are located in a first and a second OFDM symbols, a first and a third OFDM symbols, or a second and a third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division; or for a special subframe configured as 7 in a situation that an extended CP is used, a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The first five orthogonal frequency division multiplexing OFDM symbols of the first time slot in the physical resource block pair include all the resource elements used for carrying the user-dedicated pilot signal, including:

for special subframes configured as 0 and 5 in a situation that a normal CP is used, a user-dedicated pilot signal at the at least one antenna port is carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division; or for special subframes configured as 0 and 4 in a situation that an extended CP is used, a user-dedicated pilot signal at the at least one antenna port is located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Embodiments of the present application also provide another method for receiving a pilot signal, including:

receiving a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair; and extracting the user-dedicated pilot signal from the physical resource block pair.

The first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

for a normal subframe in a situation that a normal cyclic prefix CP is used, the first part includes 6 resource elements, the first part of the resource elements are located in a second and a third OFDM symbols, or a third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in same 3 subcarriers in frequency domain, adjacent subcarriers in the 3 same subcarriers have an interval of 4 subcarriers; and for a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

In still another embodiment, embodiments of the present application provide a base station, including:

a first determining module, configured to determine a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal; and a first transmitting module, configured to transmit the physical resource block pair which is used for carrying the user-dedicated pilot signal.

The first five OFDM symbols of the first time slot in the physical resource block pair include all the resource elements used for carrying the user-dedicated pilot signal, including:

the number of resource elements carrying the user-dedicated pilot signals at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying user-dedicated pilot signals at different antenna ports are located in different subcarriers or different OFDM symbols of the first five OFDM symbols in the physical resource block pair; or, the number of resource elements carrying the user-dedicated pilot signal at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The number of the resource elements used for carrying the user-dedicated pilot signal at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying user-dedicated pilot signals at different antenna ports are located in different subcarriers or different OFDM symbols out of the first five OFDM symbols in the physical resource block pair, including:

for special subframes configured as 0 and 5 in a situation that a normal cyclic prefix CP is used, a user-dedicated pilot signal at each antenna is carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying user-dedicated pilot signals at different antenna ports are located in different subcarriers in the physical resource block pair.

The number of resource elements carrying the user-dedicated pilot signal at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair, including:

for special subframes configured as 0 and 4 in a situation that an extended CP is used, a user-dedicated pilot signal at each antenna port is carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying user-dedicated pilot signals at different antenna ports are located in different subcarriers in the physical resource block pair; or for a special subframe configured as 7 in a situation that an extended CP is used, a user-dedicated pilot signal at each antenna port is carried in 4 resource elements in the physical resource block pair, the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols out of the first five OFDM symbols in the physical resource block pair.

The first five orthogonal frequency division multiplexing OFDM symbols of the first time slot in the physical resource block pair include all the resource elements used for carrying the user-dedicated pilot signal, including:

a user-dedicated pilot signal at the at least one antenna port is carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division; or a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The user-dedicated pilot signal at the at least one antenna port is carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division, including:

for special subframes configured as 0 and 5 in a situation that a normal CP is used, a user-dedicated pilot signals at the at least one antenna port is carried in 6 resource elements in the physical resource block pair, the 6 resource elements are located in a first and a second OFDM symbols, a first and a third OFDM symbols, or a second and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signal at the at least one antenna port is carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, user-dedicated pilot signals at different antenna ports carried in the same resource element are differentiated by the manner of code division, including:

for special subframes configured as 0 and 4 in a situation that an extended CP is used, a user-dedicated pilot signal at the at least one antenna port is carried in 8 resource elements in the physical resource block pair, the 8 resource elements are located in a first and a second OFDM symbols, a first and a third OFDM symbols, or a second and a third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division; or for a special subframe configured as 7 in a situation that an extended CP is used, a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The first five orthogonal frequency division multiplexing OFDM symbols of the first time slot in the physical resource block pair include all the resource elements used for carrying the user-dedicated pilot signal, including:

for special subframes configured as 0 and 5 in a situation that a normal CP is used, a user-dedicated pilot signal at the at least one antenna port is carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division; or for special subframes configured as 0 and 4 in a situation that an extended CP is used, a user-dedicated pilot signal at the at least one antenna port is located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Embodiments of the present application also provide another base station, including:

a second determining module, configured to determine a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair; and a second transmitting module, configured to transmit the physical resource block pair which is used for carrying the user-dedicated pilot signal.

The first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

for a normal subframe in a situation that a normal cyclic prefix CP is used, the first part includes 6 resource elements, the first part of the resource elements are located in a second and a third OFDM symbols, or a third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in same three subcarriers in frequency domain, adjacent subcarriers in the same three subcarriers have an interval of 4 subcarriers; and for a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

In still another aspect, embodiments of the present application provide a user equipment, including:

a first receiving module, configured to receive a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal; and a first acquiring module, configured to extract the user-dedicated pilot signal from the physical resource block pair.

The first five OFDM symbols of the first time slot in the physical resource block pair include all the resource elements used for carrying the user-dedicated pilot signal, including:

the number of resource elements carrying the user-dedicated pilot signals at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying user-dedicated pilot signals at different antenna ports are located in different subcarriers or different OFDM symbols of the first five OFDM symbols in the physical resource block pair; or, the number of resource elements carrying the user-dedicated pilot signal at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The number of the resource elements carrying the user-dedicated pilot signals at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying user-dedicated pilot signals at different antenna ports are located in different subcarriers or different OFDM symbols of the first five OFDM symbols in the physical resource block pair, including:

for special subframes configured as 0 and 5 in a situation that a normal cyclic prefix CP is used, a user-dedicated pilot signal at each antenna is carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying user-dedicated pilot signals at different antenna ports are located in different subcarriers in the physical resource block pair.

The number of resource elements carrying the user-dedicated pilot signal at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair, including:

for special subframes configured as 0 and 4 in a situation that an extended CP is used, a user-dedicated pilot signal at each antenna port is carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying user-dedicated pilot signals at different antenna ports are located in different subcarriers in the physical resource block pair; or for a special subframe configured as 7 in a situation that an extended CP is used, a user-dedicated pilot signal at each antenna port is carried in 4 resource elements in the physical resource block pair, the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The first five orthogonal frequency division multiplexing OFDM symbols of the first time slot in the physical resource block pair include all the resource elements carrying the user-dedicated pilot signal, including:

a user-dedicated pilot signal at the at least one antenna port is carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division; or a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The user-dedicated pilot signals at the at least one antenna port is carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division, including:

for special subframes configured as 0 and 5 in a situation that a normal CP is used, a user-dedicated pilot signal at the at least one antenna port is carried in 6 resource elements in the physical resource block pair, the 6 resource elements are located in a first and a second OFDM symbols, a first and a third OFDM symbols, or a second and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signal at the at least one antenna port is carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, user-dedicated pilot signals at different antenna ports carried in the same resource element are differentiated by the manner of code division, including:

for special subframes configured as 0 and 4 in a situation that an extended CP is used, a user-dedicated pilot signal at the at least one antenna port is carried in 8 resource elements in the physical resource block pair, the 8 resource elements are located in a first and a second OFDM symbols, a first and a third OFDM symbols, or a second and a third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division; or for a special subframe configured as 7 in a situation that an extended CP is used, a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The first five orthogonal frequency division multiplexing OFDM symbols of the first time slot in the physical resource block pair include all the resource elements used for carrying the user-dedicated pilot signal, including:

for special subframes configured as 0 and 5 in a situation that a normal CP is used, a user-dedicated pilot signal at the at least one antenna port is carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division; or for special subframes configured as 0 and 4 in a situation that an extended CP is used, a user-dedicated pilot signal at the at least one antenna port is located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Embodiments of the present application also provide another user equipment, including:

a second receiving module, configured to receive a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair; and a second acquiring module, configured to extract the user-dedicated pilot signal from the physical resource block pair.

The first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

for a normal subframe in a situation that a normal cyclic prefix CP is used, the first part includes 6 resource elements, the first part of the resource elements are located in a second and a third OFDM symbols, or a third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in same 3 subcarriers in frequency domain, adjacent subcarriers in the 3 same subcarriers have an interval of 4 subcarriers; and for a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

Embodiments of the present application also provide still another base station, including:

a first processor, configured to determine a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal; and a first transmitter, configured to transmit the physical resource block pair which is used for carrying the user-dedicated pilot signal.

The first five OFDM symbols of the first time slot in the physical resource block pair include all the resource elements used for carrying the user-dedicated pilot signal, including:

the number of resource elements used for carrying the user-dedicated pilot signal at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying user-dedicated pilot signals at different antenna ports are located in different subcarriers or different OFDM symbols of the first five OFDM symbols in the physical resource block pair; or, the number of resource elements carrying the user-dedicated pilot signal at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The number of the resource elements used for carrying the user-dedicated pilot signal at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying user-dedicated pilot signals at different antenna ports are located in different subcarriers or different OFDM symbols out of the first five OFDM symbols in the physical resource block pair, including:

for special subframes configured as 0 and 5 in a situation that a normal cyclic prefix CP is used, a user-dedicated pilot signal at each antenna is carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying user-dedicated pilot signals at different antenna ports are located in different subcarriers in the physical resource block pair.

The number of resource elements used for carrying the user-dedicated pilot signal at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair, including:

for special subframes configured as 0 and 4 in a situation that an extended CP is used, a user-dedicated pilot signal at each antenna port is carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying user-dedicated pilot signals at different antenna ports are located in different subcarriers in the physical resource block pair; or for a special subframe configured as 7 in a situation that an extended CP is used, a user-dedicated pilot signal at each antenna port is carried in 4 resource elements in the physical resource block pair, the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols out of the first five OFDM symbols in the physical resource block pair.

The first five orthogonal frequency division multiplexing OFDM symbols of the first time slot in the physical resource block pair include all the resource elements used for carrying the user-dedicated pilot signal, including:

a user-dedicated pilot signal at the at least one antenna port is carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division; or a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The user-dedicated pilot signal at the at least one antenna port is carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division:

for special subframes configured as 0 and 5 in a situation that a normal CP is used, a user-dedicated pilot signal at the at least one antenna port is carried in 6 resource elements in the physical resource block pair, the 6 resource elements are located in a first and a second OFDM symbols, a first and a third OFDM symbols, or a second and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signals at the at least one antenna port is carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, user-dedicated pilot signals at different antenna ports carried in the same resource element are differentiated by the manner of code division, including:

for special subframes configured as 0 and 4 in a situation that an extended CP is used, a user-dedicated pilot signal at the at least one antenna port is carried in 8 resource elements in the physical resource block pair, the 8 resource elements are located in a first and a second OFDM symbols, a first and a third OFDM symbols, or a second and a third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division; or for a special subframe configured as 7 in a situation that an extended CP is used, a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The first five orthogonal frequency division multiplexing OFDM symbols of the first time slot in the physical resource block pair include all resource elements used for carrying the user-dedicated pilot signal, including:

for special subframes configured as 0 and 5 in a situation that a normal CP is used, a user-dedicated pilot signal at the at least one antenna port is carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division; or for special subframes configured as 0 and 4 in a situation that an extended CP is used, a user-dedicated pilot signal at the at least one antenna port is located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Embodiments of the present application also provide still another base station, including:

a second processor, configured to determine a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair; and a second transmitter, configured to transmit the physical resource block pair which is used for carrying the user-dedicated pilot signal.

The first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

for a normal subframe in a situation that a normal cyclic prefix CP is used, the first part includes 6 resource elements, the first part of the resource elements are located in a second and a third OFDM symbols, or a third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in same three subcarriers in frequency domain, adjacent subcarriers in the same three subcarriers have an interval of 4 subcarriers; and for a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

Embodiments of the present application also provide still another user equipment, including:

a first receiver, configured to receive a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal; and a third processor, configured to extract the user-dedicated pilot signal from the physical resource block pair.

The first five OFDM symbols of the first time slot in the physical resource block pair include all the resource elements used for carrying the user-dedicated pilot signal, including:

the number of resource elements carrying the user-dedicated pilot signals at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying user-dedicated pilot signals at different antenna ports are located in different subcarriers or different OFDM symbols of the first five OFDM symbols in the physical resource block pair; or, the number of resource elements carrying the user-dedicated pilot signals at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The number of the resource elements carrying the user-dedicated pilot signals at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying user-dedicated pilot signals at different antenna ports are located in different subcarriers or different OFDM symbols of the first five OFDM symbols in the physical resource block pair, including:

for special subframes configured as 0 and 5 in a situation that a normal cyclic prefix CP is used, a user-dedicated pilot signal at each antenna is carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying user-dedicated pilot signals at different antenna ports are located in different subcarriers in the physical resource block pair.

The number of resource elements carrying the user-dedicated pilot signal at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair, including:

for special subframes configured as 0 and 4 in a situation that an extended CP is used, a user-dedicated pilot signal at each antenna port is carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying user-dedicated pilot signals at different antenna ports are located in different subcarriers in the physical resource block pair; or for a special subframe configured as 7 in a situation that an extended CP is used, a user-dedicated pilot signal at each antenna port is carried in 4 resource elements in the physical resource block pair, the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying user-dedicated pilot signals at different antenna ports are located in different subcarriers or different OFDM symbols of the first five OFDM symbols in the physical resource block pair.

The first five orthogonal frequency division multiplexing OFDM symbols of the first time slot in the physical resource block pair include all the resource elements used for carrying the user-dedicated pilot signal, including:

a user-dedicated pilot signal at the at least one antenna port is carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division; or a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The user-dedicated pilot signals at the at least one antenna port is carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division:

for special subframes configured as 0 and 5 in a situation that a normal CP is used, user-dedicated pilot signals at the at least one antenna port is carried in 6 resource elements in the physical resource block pair, the 6 resource elements are located in a first and a second OFDM symbols, a first and a third OFDM symbols, or a second and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signal at the at least one antenna port is carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, user-dedicated pilot signals at different antenna ports carried in the same resource element are differentiated by the manner of code division, including:

for special subframes configured as 0 and 4 in a situation that an extended CP is used, a user-dedicated pilot signal at the at least one antenna port is carried in 8 resource elements in the physical resource block pair, the 8 resource elements are located in a first and a second OFDM symbols, a first and a third OFDM symbols, or a second and a third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division; or for a special subframe configured as 7 in a situation that an extended CP is used, a user-dedicated pilot signal at the at least one antenna port is carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

The first five orthogonal frequency division multiplexing OFDM symbols of the first time slot in the physical resource block pair include all the resource elements used for carrying the user-dedicated pilot signal, including:

for special subframes configured as 0 and 5 in a situation that a normal CP is used, a user-dedicated pilot signal at the at least one antenna port is carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division; or for special subframes configured as 0 and 4 in a situation that an extended CP is used, a user-dedicated pilot signal at the at least one antenna port is located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Embodiments of the present application provide a user equipment in still another aspect, including:

a second receiver, configured to receive a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair; and a four processor, configured to extract the user-dedicated pilot signal from the physical resource block pair.

The first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

for a normal subframe in a situation that a normal cyclic prefix CP is used, the first part includes 6 resource elements, the first part of the resource elements are located in a second and a third OFDM symbols, or a third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in same 3 subcarriers in frequency domain, adjacent subcarriers in the 3 same subcarriers have an interval of 4 subcarriers; and for a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

BRIEF DESCRIPTION OF THE DRAWINGS

FIG. 10 is a second schematic flow chart of a method for transmitting a pilot signal according to an embodiment of the present application;

FIG. 11a is a ninth schematic diagram of pilot distribution according to an embodiment of the present application;

FIG. 11b is a tenth schematic diagram of pilot distribution according to an embodiment of the present application;

DETAILED DESCRIPTION

Figure 1:
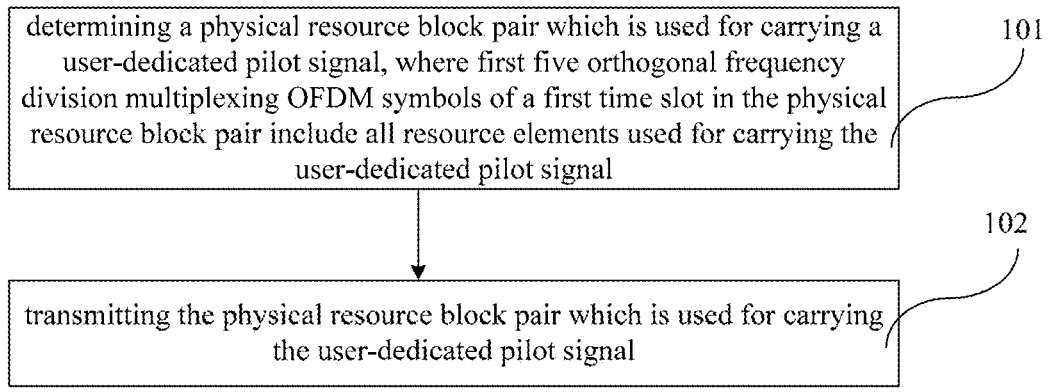
FIG. 1 is a first schematic flow chart of a method for transmitting a pilot signal according to an embodiment of the present application.

Embodiments of the present application provide a method for transmitting a pilot signal. FIG. 1 is a first schematic flow chart of a method for transmitting a pilot signal according to an embodiment of the present application, as shown in FIG. 1, including the following steps:

Step 101, determining a physical resource block pair which is used for carrying a user-dedicated pilot signal, where first five orthogonal frequency division multiplexing (OFDM) symbols of a first time slot in the physical resource block pair include all resource elements used for carrying the user-dedicated pilot signal;

In this step, a user-dedicated pilot signal is carried in a determined physical resource block when a base station transmits the user-dedicated pilot signals, and all resource elements carrying the user-dedicated pilot are located in first five OFDM symbols of a first time slot, specifically, the user-dedicated pilot signal may be a UE-specified reference symbol;

Step 102, transmitting the physical resource block pair which is used for carrying the user-dedicated pilot signal;

Since all the resource elements used for carrying the user-dedicated pilot are located in the first five OFDM symbols of the first time slot in the physical resource block pair determined in the step 101, a user equipment, after receiving the physical resource block pair, is able to perform demodulation according to the user-dedicated pilot signal.

Technical solutions provided in the above embodiment of the present application may be applied to a special subframe, in particular to a case where a cell CRS is not used in a carrier any more after NCT technologies are employed, thus, according to the above technical solutions, a user-dedicated pilot signal is provided in a special subframe, so that the special subframe can be demodulated, which can effectively improve communication data demodulation performance of a user equipment.

In the above embodiment of the present application, the first five OFDM symbols of the first time slot in the physical resource block pair include all resource elements used for carrying the user-dedicated pilot signal, which may include a plurality of manners, for instance, the number of resource elements used for carrying the user-dedicated pilot signals at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements used for carrying the user-dedicated pilot signals at different antenna ports are located in different subcarriers or different OFDM symbols of the first five OFDM symbols in the physical resource block pair. Or, the number of resource elements used for carrying the user-dedicated pilot signals at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements used for carrying the user-dedicated pilot signals at different antenna ports are located in different subcarriers or different OFDM symbols of the first five OFDM symbols in the physical resource block pair.

The number of the resource elements used for carrying the user-dedicated pilot signals at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements used for carrying the user-dedicated pilot signals at different antenna ports are located in different subcarriers or different OFDM symbols out of the first five OFDM symbols in the physical resource block pair, which may specifically be:

For special subframes which are configured as 0 and 5 in the situation that a normal CP is used, user-dedicated pilot signals at each antenna port are carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements used for carrying the user-dedicated pilot signals at different antenna ports are located in different subcarriers in the physical resource block pair. For instance, a method for carrying user-dedicated pilot signals at an antenna port 1 and an antenna port 2 in a physical resource block pair as shown in FIG. 2, where two antenna ports are provided, for the two antenna ports, different sub-carriers are used, and as shown in FIG. 2, in order to distinguish different antenna ports, sub-carriers used by them are completely different.

Figure 2:
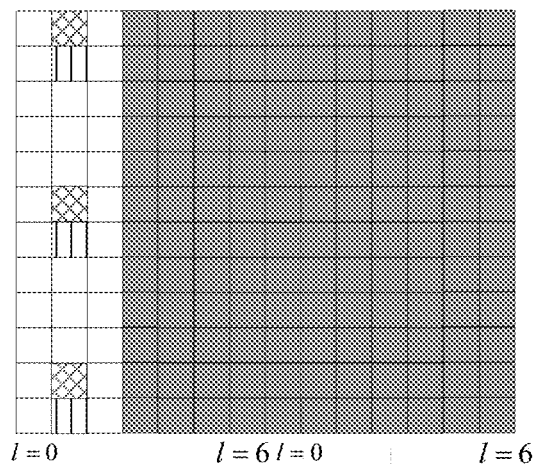
FIG. 2 is a first schematic diagram of pilot distribution according to an embodiment of the present application.

As shown in FIG. 2, which is a distribution of carried user-dedicated pilot signals at each antenna port in a resource block when two antenna ports are included, they are located in a second symbol in time domain, and are located in a first, a sixth, an eleventh subcarriers and in a second, a seventh, a twelfth subcarriers in frequency domain, for a case of more than two antenna ports, other antenna ports may be located in other symbols in time domain, and are located in 3 subcarriers in frequency domain, an interval among the 3 subcarriers is 4 sub carriers.

Furthermore, the number of the resource elements used for carrying the user-dedicated pilot signals at each antenna port is 4, the 4 resource elements are located in one OFDM symbol of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, and when at least two antenna ports are included, resource elements used for carrying the user-dedicated pilot signals at different antenna ports are located in different subcarriers or different OFDM symbols of the first five OFDM symbols in the physical resource block pair, this is mainly for special subframes configured as 0, 4, 7 in the situation that an extended CP is used, any one or two of the following manners may be included, for instance:

For special subframes configured as 0 and 4 in the situation that an extended CP is used, user-dedicated pilot signals at each antenna port are carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements used for carrying the user-dedicated pilot signals at different antenna ports are located in different subcarriers in the physical resource block pair. For instance, a method for carrying user-dedicated pilot signals at an antenna port 1 and an antenna port 2 in a physical resource block pair as shown in FIG. 3, where two antenna ports are provided.

Figure 3:
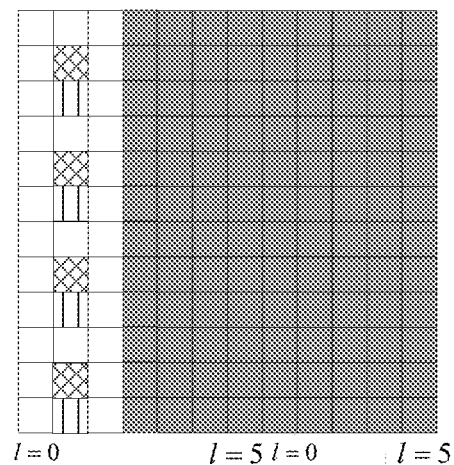
FIG. 3 is a second schematic diagram of pilot distribution according to an embodiment of the present application.

As shown in FIG. 3, which is a distribution of carried user-dedicated pilot signals at each antenna port in a resource block when two antenna ports are included, they are located in a second symbol in time domain, and are located in a second, a fifth, an eighth, an eleventh subcarriers and in a third, a sixth, a ninth, a twelfth subcarriers in frequency domain, for a case of more than two antenna ports, other antenna ports may be located in other symbols in time domain, and are located in 4 subcarriers in frequency domain, an interval among the 4 subcarriers is 2 subcarriers.

Figure 4:
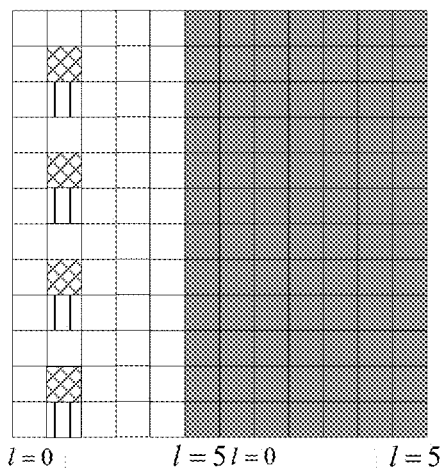
FIG. 4 is a third schematic diagram of pilot distribution according to an embodiment of the present application.

For a special subframe configured as 7 in the situation that an extended CP is used, user-dedicated pilot signals at each antenna port are carried in 4 resource elements in the physical resource block pair, the resource elements are located in any one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements used for carrying the user-dedicated pilot signals at different antenna ports are located in different subcarriers or different OFDM symbols of the first five OFDM symbols in the physical resource block pair. For instance, a method for carrying user-dedicated pilot signals at an antenna port 1 and an antenna port 2 in a physical resource block pair as shown in FIG. 4, where two antenna ports are provided.

In the above embodiments, in a case where one antenna port may be included or a plurality of antenna ports may be included, for the case where only one antenna port is included, it only needs to perform a pilot design according to the above implementations; if a plurality of antenna ports are included, then user-dedicated pilot signals at different antenna ports may be carried in different resource elements, and embodiments of the present application also provide another implementation, in which user-dedicated pilot signals at different antenna ports may be multiplexed in a same resource element, and the user-dedicated pilot information at different antenna ports which is carried in the same resource element is differentiated by a manner of code division. Specifically, all the resources elements used for carrying the user-dedicated pilot signals are located in first five OFDM symbols of the first time slot in the physical resource block pair, which includes the following manners.

One manner is that, user-dedicated pilot signals at the at least one antenna port are carried in 6 resource elements in the physical resource block pair, the 6 resource elements are located in any two OFDM symbols of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, user-dedicated pilot signals at different antenna ports carried in a same resource element are differentiated by a manner of code division.

Or, another manner is that, user-dedicated pilot signals at the at least one antenna port are carried in 8 resource elements in the physical resource block pair, the 8 resource elements are located in any two OFDM symbols of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, user-dedicated pilot signals at different antenna ports carried in a same resource element are differentiated by a manner of code division.

Figure 5:
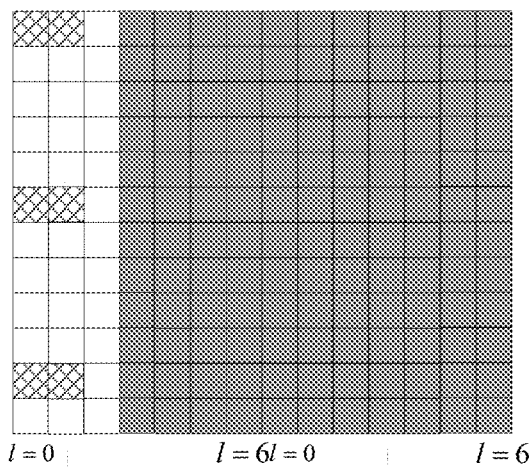
FIG. 5 is a fourth schematic diagram of pilot distribution according to an embodiment of the present application.

For the first format, it is mainly for special subframes which are configured as 0 and 5 in a situation that a normal CP is used, specifically, for special subframes configured as 0 and 5 in the situation that a normal CP is used, user-dedicated pilot signals at the at least one antenna port are carried in 6 resource elements in the physical resource block pair, the 6 resource elements are located in a first and a second OFDM symbols, the first and a third OFDM symbols, or the second and the third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division. Specifically, as shown in FIG. 5, resource elements carrying the user-dedicated pilot signals are distributed in 3 subcarriers, which have an interval of 4 subcarriers thereamong, the resource elements provided in FIG. 5 are located in a first and a second symbols in time domain, and additionally may also be located in the second and a third symbols, or located in the first and the third symbols.

Figure 6:
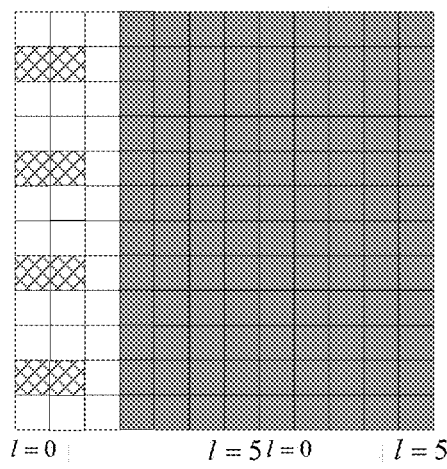
FIG. 6 is a fifth schematic diagram of pilot distribution according to an embodiment of the present application.

For the second format, especially for special subframes configured as 0, 4, 7 in a situation that an extended CP is used, specifically, any one or two of the following situations may be included:

For special subframes configured as 0 and 4 in the situation that an extended CP is used, user-dedicated pilot signals at the at least one antenna port are carried in 8 resource elements in the physical resource block pair, the 8 resource elements are located in a first and a second OFDM symbols, the first and a third OFDM symbols, or the second and the third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division. Specifically, as shown in FIG. 6, the resource elements are distributed in 4 subcarriers, which have an interval of 2 subcarriers there among, although the resource elements provided in FIG. 6 are located in a first and a second symbols, persons skilled in the art may understand that they may be located in the second and a third symbols, or located in the first and the third symbols.

Figure 7:
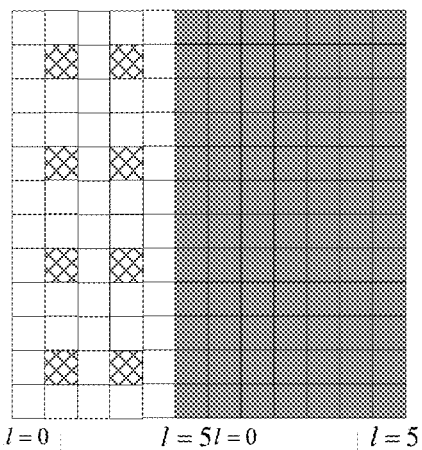
FIG. 7 is a sixth schematic diagram of pilot distribution according to an embodiment of the present application.

For a special subframe configured as 7 in the situation that an extended CP is used, user-dedicated pilot signals at the at least one antenna port are carried in 8 resource elements in the physical resource block pair, the 8 resource elements are located in any two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division. Specifically, as shown in FIG. 7, the resource elements are distributed in 3 subcarriers, which have an interval of 4 subcarriers thereamong, the resource elements provided in FIG. 7 are located in a second and a fourth symbols, and additionally may also be located in the second and a third symbols, a first and a fifth symbols, or located in the third and the fourth symbols, etc., antenna ports are differentiated by a manner of code division.

Figure 8:
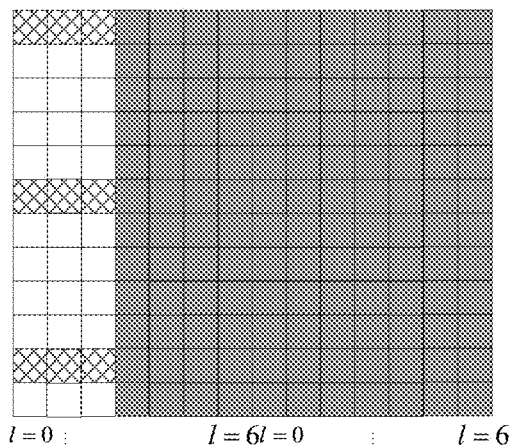
FIG. 8 is a seventh schematic diagram of pilot distribution according to an embodiment of the present application.

Furthermore, a primary concern is that an EPDCCH needs to be transmitted in a special subframe, a basic unit constituting the EPDCCH is an EREG, where each EREG includes 9 resource elements, in this case, a user-dedicated pilot signal (a UE-specific reference signal) may be designed according to a resource of the EPDCCH to ensure user resource elements without the user-dedicated pilot signal are an integer multiple of the EREG Specifically, all the resource elements used for carrying the user-dedicated pilot signals are located in the first five OFDM symbols of the first time slot in the physical resource block pair, including:

For special subframes configured as 0 and 5 in a situation that a normal CP is used, user-dedicated pilot signals at the at least one antenna port are carried in 9 resource elements in the physical resource block pair, the 9 resource elements are located in first three OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division. As shown in FIG. 8, the user-dedicated pilot signals occupy 9 resource elements, where the resource elements are distributed in 3 subcarriers, and completely occupy first three symbols of the 3 subcarriers, the 3 subcarriers have an interval of 4 subcarriers thereamong, user-dedicated pilot signals at different antenna ports carried in a same resource element are differentiated by a manner of code division.

Figure 9:
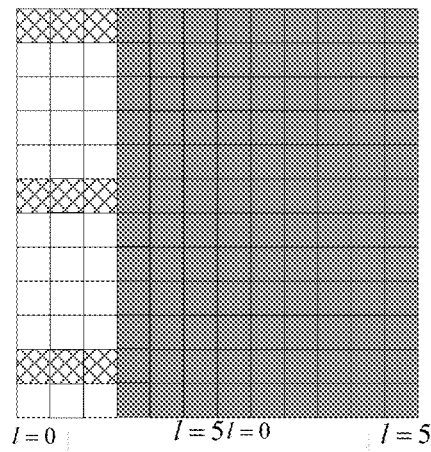
FIG. 9 is an eighth schematic diagram of pilot distribution according to an embodiment of the present application.

For special subframes configured as 0 and 4 in a situation that an extended CP is used, user-dedicated pilot signals at the at least one antenna port are located in 9 resource elements in the physical resource block pair, where the 9 resource elements are located in first three OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division. As shown in FIG. 9, the user-dedicated pilot signals occupy 9 resource elements, where the resource elements are distributed in 3 subcarriers, and completely occupy first three symbols of the 3 subcarriers, the 3 subcarriers have an interval of 4 subcarriers there among.

Embodiments of the present application also provide a technical solution for a physical downlink normal subframe, FIG. 10 is a second schematic flow chart of a method for transmitting a pilot signal according to an embodiment of the present application, as shown in FIG. 10, including the following steps:

Step 201, determining a physical resource block pair which is used for carrying user-dedicated pilot signal, where resource elements used for carrying the user-dedicated pilot signal include a first part and a second part, the first part of the resource elements are located in any two OFDM symbols of first four OFDM symbols of a first time slot in the physical resource block pair, and the second part of the resource elements are located in first two or last two OFDM symbols of a second time slot in the physical resource block pair;

Step 202, transmitting the physical resource block pair which is used for carrying the user-dedicated pilot signal.

In the embodiments of the present application above, resource elements used for carrying a user-dedicated pilot signal are provided in two parts, where the first part of the resource elements is located in first four OFDM symbols of the first time slot, such that the user-dedicated pilot signals can be utilized to demodulate signals carried in other resource elements in the first time slot, in contrast to the prior art where user-dedicated pilot signals are all carried in last two OFDM symbols of each time slot, demodulation performance of a user equipment can be improved significantly.

In the above embodiments, the second part of the resource elements user for carrying the user-dedicated pilot signals may be located in last two OFDM symbols of the second time slot or located in first two OFDM symbols of the second time slot, embodiments of the present application will not make a limitation.

Figure 12A:
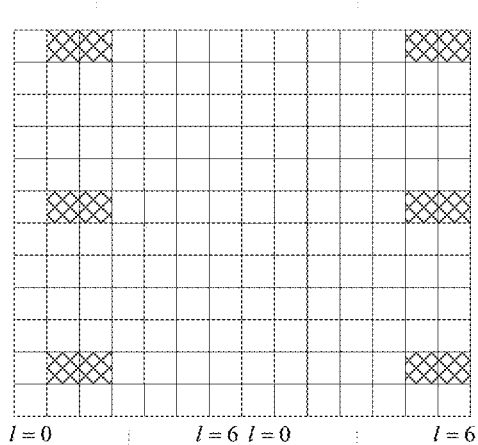
FIG. 12a is an eleventh schematic diagram of pilot distribution according to an embodiment of the present application.
Figure 12B:
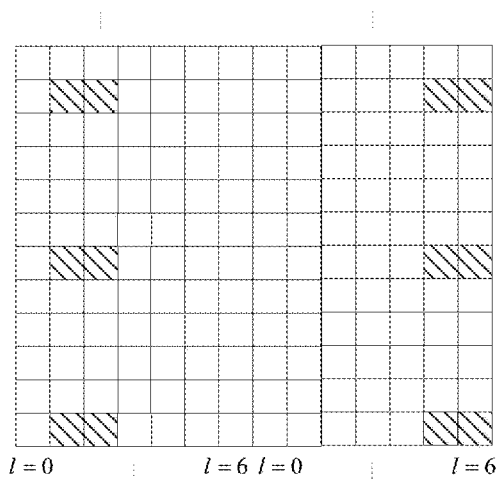
FIG. 12b is a twelfth schematic diagram of pilot distribution according to an embodiment of the present application.

Specifically, the first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including the following:

For a normal subframe in a situation that a normal CP is used, the first part includes 6 resource elements, the first part of the resource elements are located in a second and a third OFDM symbols, or the third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the second part of the resource elements are located in last two OFDM symbols of the second time slot in the physical resource block pair in time domain, and are located in the same three subcarriers in frequency domain. For instance, as shown in FIG. 11*a* and FIG. 11*b*, the first part of the resource elements used for carrying the user-dedicated pilot signals are located in a third and a fourth symbols of the first time slot, and are distributed in 3 subcarriers in frequency domain, specifically including two manners as shown in FIG. 11*a* and FIG. 11*b*, where resource element used for carrying a user-dedicated pilot signal in the first time slot and a resource element used for carrying a user-dedicated pilot signal in the second time slot are located in the same subcarrier. Or, as shown in FIG. 12*a* and FIG. 12*b*, the first part of the resource elements used for carrying the user-dedicated pilot signals are located in a second and a third symbols of the first time slot, and are distributed in 3 subcarriers in frequency domain, specifically including two manners as shown in FIG. 12*a* and FIG. 12*b*, where a resource element used for carrying a user-dedicated pilot signal in the first time slot and a resource element used for carrying a user-dedicated pilot signal in the second time slot are located in the same subcarrier.

Figure 13:
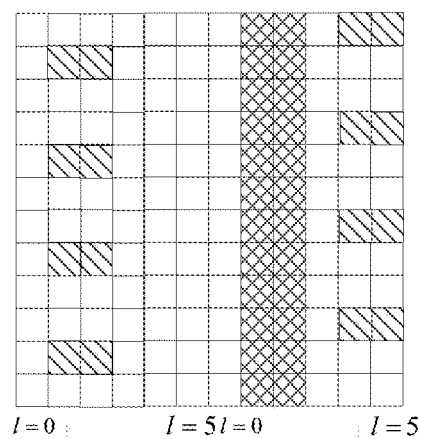
FIG. 13 is a thirteenth schematic diagram of pilot distribution according to an embodiment of the present application.

Or, for a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers. As shown in FIG. 13, the resource elements carrying the user-dedicated pilot signals are located in a second and a third symbols of the first time slot, and are distributed in 4 subcarriers in frequency domain, a resource element carrying a user-dedicated pilot signal in the first time slot and a resource element carrying a user-dedicated pilot signal in the second time slot are located in different subcarriers.

In the above embodiments, the second part of the resource elements are all located in last two symbols of the second time slot, however, they may also be located in first two symbols of the second time slot in time domain, and a distribution thereof in frequency domain may be referred to the above embodiments.

Figure 14:
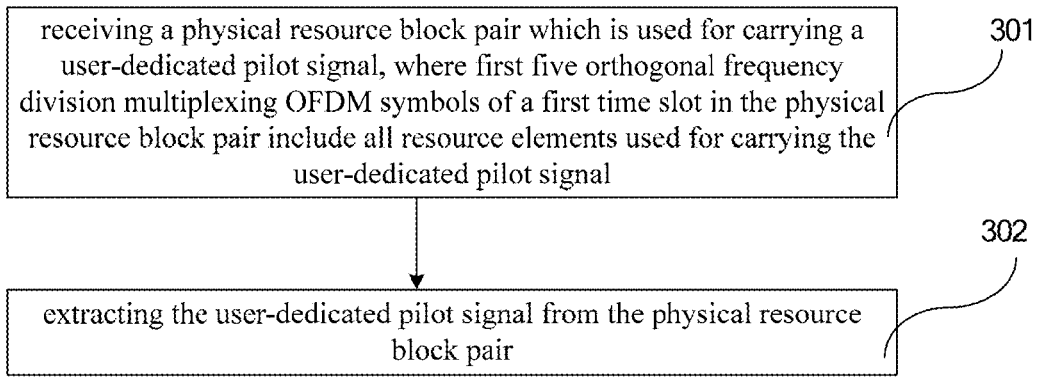
FIG. 14 is a first schematic flow chart of a method for receiving a pilot signal according to an embodiment of the present application.

Embodiments of the present application also provide a receiving method corresponding to embodiments as shown in FIG. 1, FIG. 14 is a first schematic flow chart of a method for receiving a pilot signal according to an embodiment of the present application, as shown in FIG. 14, including the following steps:

Step 301, receiving a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal;

Step 302: extracting the user-dedicated pilot signal from the physical resource block pair.

The first five OFDM symbols of the first time slot in the physical resource block pair include all resource elements used for carrying the user-dedicated pilot signal, including:

The number of resource elements carrying the user-dedicated pilot signals at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying the user-dedicated pilot signals at different antenna ports are located in different subcarriers or different OFDM symbols of the first five OFDM symbols in the physical resource block pair;

Or, the number of resource elements carrying the user-dedicated pilot signals at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair.

Specifically, the number of the resource elements carrying the user-dedicated pilot signals at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying the user-dedicated pilot signals at different antenna ports are located in different subcarriers or different OFDM symbols of the first five OFDM symbols in the physical resource block pair, including:

For special subframes configured as 0 and 5 in a situation that a normal cyclic prefix CP is used, user-dedicated pilot signals at each antenna are carried in 3 resource elements in the physical resource block pair, where the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying the user-dedicated pilot signals at different antenna ports are located in different subcarriers in the physical resource block pair.

The number of resource elements carrying the user-dedicated pilot signals at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair, including:

For special subframes configured as 0 and 4 in a situation that an extended CP is used, user-dedicated pilot signals at each antenna port are carried in 4 resource elements in the physical resource block pair, where the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying the user-dedicated pilot signals at different antenna ports are located in different subcarriers in the physical resource block pair;

Or, for a special subframe configured as 7 in a situation that an extended CP is used, user-dedicated pilot signals at each antenna port are carried in 4 resource elements in the physical resource block pair, where the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair.

In another embodiment, the first five orthogonal frequency division multiplexing OFDM symbols of the first time slot in the physical resource block pair include all resource elements used for carrying the user-dedicated pilot signals, including:

User-dedicated pilot signals at the at least one antenna port are carried in 6 resource elements in the physical resource block pair, where the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division;

Or, user-dedicated pilot signals at the at least one antenna port are carried in 8 resource elements in the physical resource block pair, where the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

Where, the user-dedicated pilot signals at the at least one antenna port are carried in 6 resource elements in the physical resource block pair, where the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division, including:

For special subframes configured as 0 and 5 in a situation that a normal CP is used, user-dedicated pilot signals at the at least one antenna port are carried in 6 resource elements in the physical resource block pair, where the 6 resource elements are located in a first and a second OFDM symbols, the first and a third OFDM symbols, or the second and the third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Specifically, the user-dedicated pilot signals at the at least one antenna port are carried in 8 resource elements in the physical resource block pair, where the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, the user-dedicated pilot signals at different antenna ports carried in the same resource element are differentiated by the manner of code division, including:

For special subframes configured as 0 and 4 in a situation that an extended CP is used, user-dedicated pilot signals at the at least one antenna port are carried in 8 resource elements in the physical resource block pair, the 8 resource elements are located in a first and a second OFDM symbols, the first and a third OFDM symbols, or the second and the third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division;

Or, for a special subframe configured as 7 in a situation that an extended CP is used, user-dedicated pilot signals at the at least one antenna port are carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

In a third embodiment, the first five orthogonal frequency division multiplexing OFDM symbols of the first time slot in the physical resource block pair include all resource elements used for carrying the user-dedicated pilot signals, including:

For special subframes configured as 0 and 5 in a situation that a normal CP is used, user-dedicated pilot signals at the at least one antenna port are carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division;

Or, for special subframes configured as 0 and 4 in a situation that an extended CP is used, user-dedicated pilot signals at the at least one antenna port are located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Figure 15:
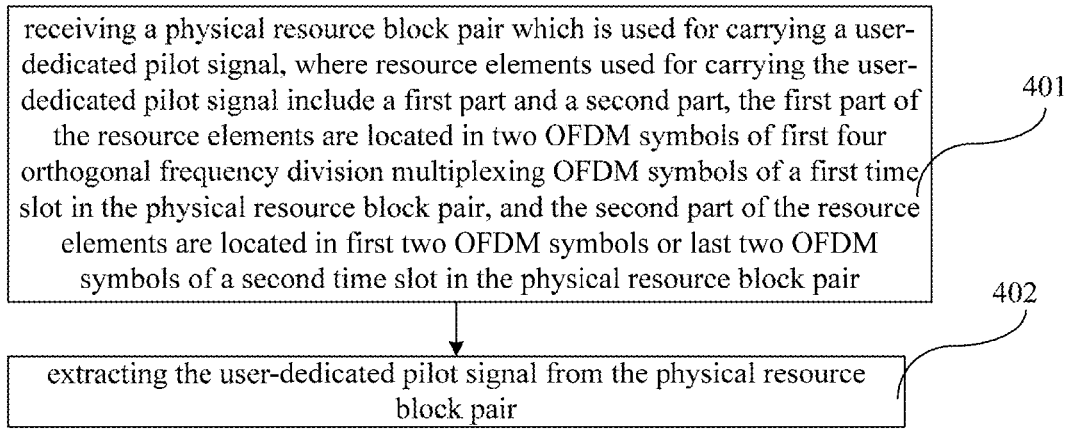
FIG. 15 is a second schematic flow chart of a method for receiving a pilot signal according to an embodiment of the present application.

Embodiments of the present application also provide another method for receiving communication data, FIG. 15 is a second schematic flow chart of a method for receiving a pilot signal according to an embodiment of the present application, as shown in FIG. 15, including the following steps:

Step 401, receiving a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, and the second part of the resource elements are located in first two OFDM symbols or last two OFDM symbols of a second time slot in the physical resource block pair;

Step 402, extracting the user-dedicated pilot signal from the physical resource block pair.

In specific embodiments of the present application, the first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

For a normal subframe in a situation that a normal cyclic prefix CP is used, the first part includes 6 resource elements, the first part of the resource elements are located in a second and a third OFDM symbols, or the third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in the same 3 subcarriers in frequency domain, adjacent subcarriers in the 3 same subcarriers have an interval of 4 subcarriers;

For a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

Figure 16:
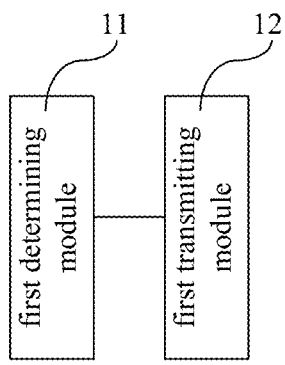
FIG. 16 is a first schematic structural diagram of a base station according to an embodiment of the present application.

Embodiments of the present application also provide a base station corresponding to embodiments as shown in FIG. 1. FIG. 16 is a first schematic structural diagram of a base station according to an embodiment of the present application, as shown in FIG. 16, the base station includes a first determining module 11 and a first transmitting module 12, where the first determining module 11 is configured to determine a physical resource block pair which is used for carrying a user-dedicated pilot signal, where, first five orthogonal frequency division multiplexing OFDM symbols of a first time slot in the physical resource block pair include all resource elements used for carrying the user-dedicated pilot signal; and the first transmitting module 12 is configured to transmit the physical resource block pair which is used for carrying the user-dedicated pilot signal.

In embodiments of the present application described above, the first five OFDM symbols of the first time slot in the physical resource block pair include resource elements used for carrying the user-dedicated pilot signal, including the following situations:

For instance, the number of resource elements carrying the user-dedicated pilot signals at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying the user-dedicated pilot signals at different antenna ports are located in different subcarriers or different OFDM symbols of the first five OFDM symbols in the physical resource block pair.

Or, the number of resource elements carrying the user-dedicated pilot signals at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair.

Specifically, the number of the resource elements carrying the user-dedicated pilot signals at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying the user-dedicated pilot signals at different antenna ports are located in different subcarriers or different OFDM symbols of the first five OFDM symbols in the physical resource block pair, including:

For special subframes configured as 0 and 5 in a situation that a normal cyclic prefix CP is used, user-dedicated pilot signals at each antenna are carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying the user-dedicated pilot signals at different antenna ports are located in different subcarriers.

The number of resource elements carrying the user-dedicated pilot signals at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair, including:

For special subframes configured as 0 and 4 in a situation that an extended CP is used, user-dedicated pilot signals at each antenna port are carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying the user-dedicated pilot signals at different antenna ports are located in different subcarriers in the physical resource block pair.

Or, for a special subframe configured as 7 in a situation that an extended CP is used, user-dedicated pilot signals at each antenna port are carried in 4 resource elements in the physical resource block pair, the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair.

In another implementation, all resource elements used for carrying the user-dedicated pilot signals are located in the first five OFDM symbols of the first time slot in the physical resource block pair, including:

The first five orthogonal frequency division multiplexing OFDM symbols of the first time slot in the physical resource block pair include all resource elements used for carrying the user-dedicated pilot signals, including:

User-dedicated pilot signals at the at least one antenna port are carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division;

Or, user-dedicated pilot signals at the at least one antenna port are carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

Specifically, the user-dedicated pilot signals at the at least one antenna port are carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division, including:

For special subframes configured as 0 and 5 in a situation that a normal CP is used, user-dedicated pilot signals at the at least one antenna port are carried in 6 resource elements in the physical resource block pair, the 6 resource elements are located in a first and a second OFDM symbols, the first and a third OFDM symbols, or the second and the third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signals at the at least one antenna port are carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, the user-dedicated pilot signals at different antenna ports carried in the same resource element are differentiated by the manner of code division, including:

For special subframes configured as 0 and 4 in a situation that an extended CP is used, user-dedicated pilot signals at the at least one antenna port are carried in 8 resource elements in the physical resource block pair, the 8 resource elements are located in a first and a second OFDM symbols, the first and a third OFDM symbols, or the second and the third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division;

Or, for a special subframe configured as 7 in a situation that an extended CP is used, user-dedicated pilot signals at the at least one antenna port are carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

Embodiments of the present application also provide another implementation, where, the first five orthogonal frequency division multiplexing OFDM symbols of the first time slot in the physical resource block pair include all resource elements used for carrying the user-dedicated pilot signals, including:

For special subframes configured as 0 and 5 in a situation that a normal CP is used, user-dedicated pilot signals at the at least one antenna port are carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division;

Or, for special subframes configured as 0 and 4 in a situation that an extended CP is used, user-dedicated pilot signals at the at least one antenna port are located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Figure 17:
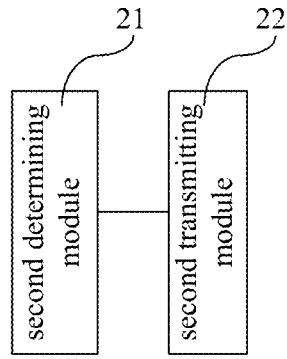
FIG. 17 is a second schematic structural diagram of a base station according to an embodiment of the present application.

Embodiments of the present application also provide another base station, FIG. 17 is a second schematic structural diagram of a base station according to an embodiment of the present application, as shown in FIG. 17, the base station includes a second determining module 21 and a second transmitting module 22, where the second determining module 21 is configured to determine a physical resource block pair which is used for carrying a user-dedicated pilot signal, where resource elements used for carrying the user-dedicated pilot signals include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair; and the second transmitting module 22 is configured to transmit the physical resource block pair which is used for carrying the user-dedicated pilot signal.

In embodiments of the present application described above, the first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

For a normal subframe in a situation that a normal cyclic prefix CP is used, the first part includes 6 resource elements, the first part of the resource elements are located in a second and a third OFDM symbols, or the third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in the same three subcarriers in frequency domain, adjacent subcarriers in the same three subcarriers have an interval of 4 subcarriers;

For a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

Figure 18:
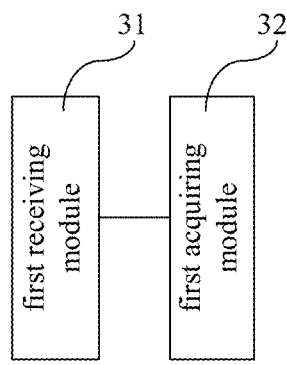
FIG. 18 is a first schematic structural diagram of a user equipment according to an embodiment of the present application.

Embodiments of the present application also provide a corresponding user equipment. FIG. 18 is a first schematic structural diagram of a user equipment according to an embodiment of the present application, as shown in FIG. 18, the user equipment includes a first receiving module 31 and a first acquiring module 32, where the first receiving module 31 is configured to receive a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal; and the first acquiring module 32 is configured to extract the user-dedicated pilot signal from the physical resource block pair.

In embodiments of the present application described above, the first five OFDM symbols of the first time slot in the physical resource block pair include all resource elements used for carrying the user-dedicated pilot signals, which may include the following situations.

For instance, the number of resource elements carrying the user-dedicated pilot signals at each antenna port is 3, the 3 resource elements are located in one OFDM symbol of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, and when at least two antenna ports are included, resource elements carrying the user-dedicated pilot signals at different antenna ports are located in different subcarriers or different OFDM symbols of the first five OFDM symbols in the physical resource block pair;

Or, the number of resource elements carrying the user-dedicated pilot signals at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements used for carrying the user-dedicated pilot signals at different antenna ports are located in different subcarriers or different OFDM symbols of the first five OFDM symbols in the physical resource block pair.

Specifically, the number of the resource elements carrying the user-dedicated pilot signals at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying the user-dedicated pilot signals at different antenna ports are located in different subcarriers or different OFDM symbols of the first five OFDM symbols in the physical resource block pair, including:

For special subframes configured as 0 and 5 in a situation that a normal cyclic prefix CP is used, user-dedicated pilot signals at each antenna are carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying the user-dedicated pilot signals at different antenna ports are located in different subcarriers in the physical resource block pair.

The number of resource elements carrying the user-dedicated pilot signals at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements used for carrying the user-dedicated pilot signals at different antenna ports are located in different subcarriers or different OFDM symbols of the first five OFDM symbols in the physical resource block pair, including:

For special subframes configured as 0 and 4 in a situation that an extended CP is used, user-dedicated pilot signals at each antenna port are carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying the user-dedicated pilot signals at different antenna ports are located in different subcarriers in the physical resource block pair;

Or, for a special subframe configured as 7 in a situation that an extended CP is used, user-dedicated pilot signals at each antenna port are carried in 4 resource elements in the physical resource block pair, the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair.

Embodiments of the present application also provide an implementation, the first five orthogonal frequency division multiplexing OFDM symbols of the first time slot in the physical resource block pair include all resource elements used for carrying the user-dedicated pilot signals, including:

User-dedicated pilot signals at the at least one antenna port are carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division;

Or, user-dedicated pilot signals at the at least one antenna port are carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

Specifically, the user-dedicated pilot signals at the at least one antenna port are carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division, including:

For special subframes configured as 0 and 5 in a situation that a normal CP is used, user-dedicated pilot signals at the at least one antenna port are carried in 6 resource elements in the physical resource block pair, the 6 resource elements are located in a first and a second OFDM symbols, the first and a third OFDM symbols, or the second and the third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signals at the at least one antenna port are carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, the user-dedicated pilot signals at different antenna ports carried in the same resource element are differentiated by the manner of code division, including:

For special subframes configured as 0 and 4 in a situation that an extended CP is used, user-dedicated pilot signals at the at least one antenna port are carried in 8 resource elements in the physical resource block pair, the 8 resource elements are located in a first and a second OFDM symbols, the first and a third OFDM symbols, or the second and the third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division;

Or, for a special subframe configured as 7 in a situation that an extended CP is used, user-dedicated pilot signals at the at least one antenna port are carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

Embodiments of the present application also provide an implementation, the first five orthogonal frequency division multiplexing OFDM symbols of the first time slot in the physical resource block pair include all resource elements used for carrying the user-dedicated pilot signals, including:

For special subframes configured as 0 and 5 in a situation that a normal CP is used, user-dedicated pilot signals at the at least one antenna port are carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division;

Or, for special subframes configured as 0 and 4 in a situation that an extended CP is used, user-dedicated pilot signals at the at least one antenna port are located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Figure 19:
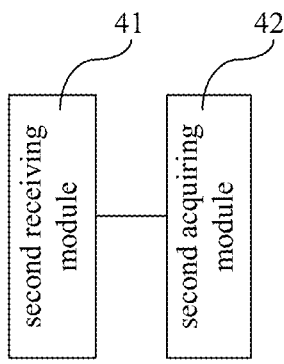
FIG. 19 is a second schematic structural diagram of a user equipment according to an embodiment of the present application.

Embodiments of the present application also provide another user equipment. FIG. 19 is a second schematic structural diagram of a user equipment according to an embodiment of the present application, as shown in FIG. 19, the user equipment includes a second receiving module 41 and a second acquiring module 42, where the second receiving module 41 is configured to receive a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair;

The second acquiring module 42 is configured to extract the user-dedicated pilot signal from the physical resource block pair. In embodiments of the present application described above, the first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

For a normal subframe in a situation that a normal cyclic prefix CP is used, the first part includes 6 resource elements, the first part of the resource elements are located in a second and a third OFDM symbols, or the third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in the same 3 subcarriers in frequency domain, adjacent subcarriers in the 3 same subcarriers have an interval of 4 subcarriers;

For a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

Figure 20:
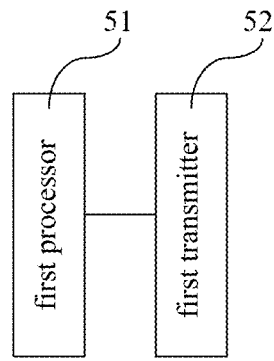
FIG. 20 is a third schematic structural diagram of a base station according to an embodiment of the present application.

Embodiments of the present application also provide a base station. FIG. 20 is a third schematic structural diagram 3 of a base station according to an embodiment of the present application, as shown in FIG. 20, the base station includes a first processor 51 and a first transmitter 52, where the first processor 51 is configured to determine a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal; and the first transmitter 52 is configured to transmit the physical resource block pair which is used for carrying the user-dedicated pilot signal.

In embodiments of the present application described above, the first five OFDM symbols of the first time slot in the physical resource block pair include the resource elements used for carrying the user-dedicated pilot signal, including the following situations.

For instance, the number of resource elements carrying the user-dedicated pilot signals at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying the user-dedicated pilot signals at different antenna ports are located in different subcarriers or different OFDM symbols of the first five OFDM symbols in the physical resource block pair.

Or, the number of resource elements carrying the user-dedicated pilot signals at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair.

Specifically, the number of the resource elements carrying the user-dedicated pilot signals at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying the user-dedicated pilot signals at different antenna ports are located in different subcarriers or different OFDM symbols of the first five OFDM symbols in the physical resource block pair, including:

For special subframes configured as 0 and 5 in a situation that a normal cyclic prefix CP is used, user-dedicated pilot signals at each antenna are carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying the user-dedicated pilot signals at different antenna ports are located in different subcarriers in the physical resource block pair.

The number of resource elements carrying the user-dedicated pilot signals at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair, including:

For special subframes configured as 0 and 4 in a situation that an extended CP is used, user-dedicated pilot signals at each antenna port are carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying the user-dedicated pilot signals at different antenna ports are located in different subcarriers in the physical resource block pair.

Or, for a special subframe configured as 7 in a situation that an extended CP is used, user-dedicated pilot signals at each antenna port are carried in 4 resource elements in the physical resource block pair, the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair.

In another implementation, all resource elements used for carrying the user-dedicated pilot signals are located in the first five OFDM symbols of the first time slot in the physical resource block pair, including:

The first five orthogonal frequency division multiplexing OFDM symbols of the first time slot in the physical resource block pair include all resource elements used for carrying the user-dedicated pilot signals, including:

User-dedicated pilot signals at the at least one antenna port are carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division;

Or, user-dedicated pilot signals at the at least one antenna port are carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

Specifically, the user-dedicated pilot signals at the at least one antenna port are carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division, including:

For special subframes configured as 0 and 5 in a situation that a normal CP is used, user-dedicated pilot signals at the at least one antenna port are carried in 6 resource elements in the physical resource block pair, the 6 resource elements are located in a first and a second OFDM symbols, the first and a third OFDM symbols, or the second and the third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signals at the at least one antenna port are carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, the user-dedicated pilot signals at different antenna ports carried in the same resource element are differentiated by the manner of code division, including:

For special subframes configured as 0 and 4 in a situation that an extended CP is used, user-dedicated pilot signals at the at least one antenna port are carried in 8 resource elements in the physical resource block pair, the 8 resource elements are located in a first and a second OFDM symbols, the first and a third OFDM symbols, or the second and the third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division;

Or, for a special subframe configured as 7 in a situation that an extended CP is used, user-dedicated pilot signals at the at least one antenna port are carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

Embodiments of the present application also provide another implementation, where, the first five orthogonal frequency division multiplexing OFDM symbols of the first time slot in the physical resource block pair include all resource elements used for carrying the user-dedicated pilot signals, including:

For special subframes configured as 0 and 5 in a situation that a normal CP is used, user-dedicated pilot signals at the at least one antenna port are carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division;

Or, for special subframes configured as 0 and 4 in a situation that an extended CP is used, user-dedicated pilot signals at the at least one antenna port are located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Figure 21:
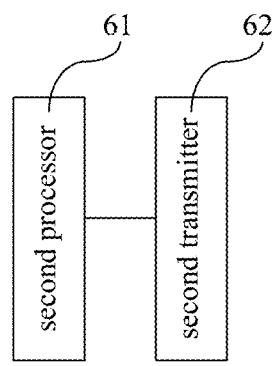
FIG. 21 is a fourth schematic structural diagram of a base station according to an embodiment of the present application.

FIG. 21 is a fourth schematic structural diagram of a base station according to an embodiment of the present application, as shown in FIG. 21, the base station includes a second processor 61 and a second transmitter 62, where the second processor 61 is configured to determine a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair; and the second transmitter 62 is configured to transmit the physical resource block pair which is used for carrying the user-dedicated pilot signal.

Specifically, the first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

For a normal subframe in a situation that a normal cyclic prefix CP is used, the first part includes 6 resource elements, the first part of the resource elements are located in a second and a third OFDM symbols, or the third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in the time domain, and are located in the same three subcarriers in frequency domain, adjacent subcarriers in the same three subcarriers have an interval of 4 subcarriers;

For a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

Figure 22:
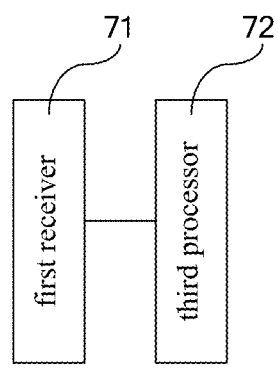
FIG. 22 is a third schematic structural diagram of a user equipment according to an embodiment of the present application.

Embodiments of the present application also provide a user equipment. FIG. 22 is a third schematic structural diagram of a user equipment according to an embodiment of the present application, as shown in FIG. 22, the user equipment includes a first receiver 71 and a third processor 72, where the first receiver 71 is configured to receive a physical resource block pair which is used for carrying a user-dedicated pilot signal, where first five orthogonal frequency division multiplexing OFDM symbols of a first time slot in the physical resource block pair include all resource elements used for carrying the user-dedicated pilot signal; and the third processor 72 is configured to extract the user-dedicated pilot signal from the physical resource block pair.

In embodiments of the present application described above, the first five OFDM symbols of the first time slot in the physical resource block pair include all resource elements used for carrying the user-dedicated pilot signals, including the following situations:

For instance, the number of resource elements carrying the user-dedicated pilot signals at each antenna port is 3, the 3 resource elements are located in one OFDM symbol of the first five OFDM symbols of the first time slot in the physical resource block pair in time domain, and are located in 3 subcarriers of the OFDM symbol in frequency domain, adjacent subcarriers in the 3 subcarriers have an interval of 4 subcarriers, and when at least two antenna ports are included, resource elements carrying the user-dedicated pilot signals at different antenna ports are located in different subcarriers or different OFDM symbols of the first five OFDM symbols in the physical resource block pair;

Or, the number of resource elements carrying the user-dedicated pilot signals at each antenna port is 4, the 4 resource elements are located in one OFDM symbol of the first five OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair.

Specifically, the number of the resource elements carrying the user-dedicated pilot signals at each antenna is 3, the 3 resource elements are located in one OFDM symbol of the first five OFDM symbols of the first time slot in the physical resource block pair in the time domain, and are located in 3 subcarriers of the OFDM symbol in the frequency domain, adjacent subcarriers in the 3 subcarriers have an interval of 4 subcarriers, and when at least two antenna ports are included, the resource elements carrying the user-dedicated pilot signals at different antenna ports are located in different subcarriers or different OFDM symbols of the first five OFDM symbols in the physical resource block pair, including:

For special subframes configured as 0 and 5 in a situation that a normal cyclic prefix CP is used, user-dedicated pilot signals at each antenna are carried in 3 resource elements in the physical resource block pair, the 3 resource elements are located in a second OFDM symbol of the first time slot in the physical resource block pair in time domain, and are located in 3 subcarriers of the OFDM symbol in frequency domain, adjacent subcarriers in the 3 subcarriers have an interval of 4 subcarriers, and when two antenna ports are included, resource elements carrying the user-dedicated pilot signals at different antenna ports are located in different subcarriers in the physical resource block pair.

The number of resource elements carrying the user-dedicated pilot signals at each antenna port is 4, the 4 resource elements are located in one OFDM symbol of the first five OFDM symbols of the first time slot in the physical resource block pair in the time domain, and are located in 4 subcarriers of the OFDM symbol in the frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair, including:

For special subframes configured as 0 and 4 in a situation that an extended CP is used, user-dedicated pilot signals at each antenna port are carried in 4 resource elements in the physical resource block pair, the 4 resource elements are located in a second OFDM symbol of the first time slot in the physical resource block pair in time domain, and are located in 4 subcarriers of the OFDM symbol in frequency domain, adjacent subcarriers in the 4 subcarriers have an interval of 2 subcarriers, and when two antenna ports are included, resource elements carrying the user-dedicated pilot signals at different antenna ports are located in different subcarriers in the physical resource block pair;

Or, for a special subframe configured as 7 in a situation that an extended CP is used, user-dedicated pilot signals at each antenna port are carried in 4 resource elements in the physical resource block pair, the 4 resource elements are located in one OFDM symbol of first four OFDM symbols of the first time slot in the physical resource block pair in time domain, and are located in 4 subcarriers of the OFDM symbol in frequency domain, adjacent subcarriers in the 4 subcarriers have an interval of 2 subcarriers, and when at least two antenna ports are included, resource elements carrying the user-dedicated pilot signals at different antenna ports are located in different subcarriers or different OFDM symbols of the first five OFDM symbols in the physical resource block pair.

Embodiments of the present application also provide an implementation, the first five orthogonal frequency division multiplexing OFDM symbols of the first time slot in the physical resource block pair include all resource elements used for carrying the user-dedicated pilot signals, including:

User-dedicated pilot signals at the at least one antenna port are carried in 6 resource elements in the physical resource block pair, the 6 resource elements are located in two OFDM symbols of the first five OFDM symbols of the first time slot in the physical resource block pair in time domain, and are located in 3 subcarriers of the OFDM symbols in frequency domain, adjacent subcarriers in the 3 subcarriers have an interval of 4 subcarriers, user-dedicated pilot signals at different antenna ports carried in a same resource element are differentiated by a manner of code division;

Or, user-dedicated pilot signals at the at least one antenna port are carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

Specifically, the user-dedicated pilot signals at the at least one antenna port are carried in 6 resource elements in the physical resource block pair, the 6 resource elements are located in two OFDM symbols of the first five OFDM symbols of the first time slot in the physical resource block pair in the time domain, and are located in 3 subcarriers of the OFDM symbols in the frequency domain, adjacent subcarriers in the 3 subcarriers have an interval of 4 subcarriers, user-dedicated pilot signals at different antenna ports carried in a same resource element are differentiated by a manner of code division, including:

For special subframes configured as 0 and 5 in a situation that a normal CP is used, user-dedicated pilot signals at the at least one antenna port are carried in 6 resource elements in the physical resource block pair, the 6 resource elements are located in a first and a second OFDM symbols, the first and a third OFDM symbols, or the second and the third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

The user-dedicated pilot signals at the at least one antenna port are carried in 8 resource elements in the physical resource block pair, the 8 resource elements are located in any two OFDM symbols of the first five OFDM symbols of the first time slot in the physical resource block pair in the time domain, and are located in 4 subcarriers of the OFDM symbols in the frequency domain, adjacent subcarriers in the 4 subcarriers have an interval of 2 subcarriers, the user-dedicated pilot signals at different antenna ports carried in the same resource element are differentiated by the manner of code division, including:

For special subframes configured as 0 and 4 in a situation that an extended CP is used, user-dedicated pilot signals at the at least one antenna port are carried in 8 resource elements in the physical resource block pair, the 8 resource elements are located in a first and a second OFDM symbols, the first and a third OFDM symbols, or the second and the third OFDM symbols of the first time slot in the physical resource block pair in time domain, and are located in 4 subcarriers in frequency domain, adjacent subcarriers in the 4 subcarriers have an interval of 2 subcarriers, user-dedicated pilot signals at different antenna ports carried in a same resource element are differentiated by a manner of code division;

Or, for a special subframe configured as 7 in a situation that an extended CP is used, user-dedicated pilot signals at the at least one antenna port are carried in 8 resource elements in the physical resource block pair, the 8 resource elements are located in two OFDM symbols of the first five OFDM symbols of the first time slot in the physical resource block pair in time domain, and are located in 4 subcarriers of the OFDM symbols in frequency domain, adjacent subcarriers in the 4 subcarriers have an interval of 2 subcarriers, user-dedicated pilot signals at different antenna ports carried in a same resource element are differentiated by a manner of code division.

Embodiments of the present application also provide an implementation, the first five orthogonal frequency division multiplexing OFDM symbols of the first time slot in the physical resource block pair include all resource elements used for carrying the user-dedicated pilot signals, including:

For special subframes configured as 0 and 5 in a situation that a normal CP is used, user-dedicated pilot signals at the at least one antenna port are carried in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division;

Or, for special subframes configured as 0 and 4 in a situation that an extended CP is used, user-dedicated pilot signals at the at least one antenna port are located in 9 resource elements in the physical resource block pair, the 9 resource elements are located in a first, a second, and a third OFDM symbols of the first time slot in the physical resource block pair in time domain, and are located in 3 subcarriers in frequency domain, adjacent subcarriers in the 3 subcarriers have an interval of 4 subcarriers, user-dedicated pilot signals at different antenna ports carried in a same resource element are differentiated by a manner of code division.

Figure 23:
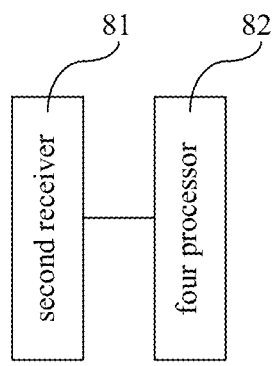
FIG. 23 is a fourth schematic structural diagram of a user equipment according to an embodiment of the present application.

FIG. 23 is a fourth schematic structural diagram of a user equipment according to an embodiment of the present application, as shown in FIG. 23, the user equipment includes a second receiver 81 and a four processor 82, where the second receiver 81 is configured to receive a physical resource block pair which is used for carrying a user-dedicated pilot signal, where resource elements used for carrying the user-dedicated pilot signal include a first part and a second part, the first part of the resource elements are located in two OFDM symbols of first four orthogonal frequency division multiplexing OFDM symbols of a first time slot in the physical resource block pair, the second part of the resource elements are located in first two OFDM symbols or last two OFDM symbols of a second time slot in the physical resource block pair; and the four processor 82 is configured to extract the user-dedicated pilot signal from the physical resource block pair.

Specifically, the first part of the resource elements are located in two OFDM symbols of first four orthogonal frequency division multiplexing OFDM symbols of the first time slot in the physical resource block pair, and the second part of the resource elements are located in first two OFDM symbols or last two OFDM symbols of the second time slot in the physical resource block pair, including any one of the following or a combination thereof:

For a normal subframe in a situation that a normal cyclic prefix CP is used, the first part includes 6 resource elements, the first part of the resource elements are located in a second and a third OFDM symbols, or the third and a fourth OFDM symbols of the first time slot in the physical resource block pair in time domain, and are located in 3 subcarriers in frequency domain, adjacent subcarriers in the 3 subcarriers have an interval of 4 subcarriers, the second part includes 6 resource elements, the 6 resource elements are located in last two OFDM symbols of the second time slot in the physical resource block pair in time domain, and are located in the same 3 subcarriers in frequency domain, adjacent subcarriers in the 3 same subcarriers have an interval of 4 subcarriers;

For a normal subframe in a situation that an extended CP is used, the first part includes 8 resource elements, the first part of the resource elements are located in a second and a third OFDM symbols of the first time slot in the physical resource block pair in time domain, and are located in 4 subcarriers in frequency domain, adjacent subcarriers in the 4 subcarriers have an interval of 2 subcarriers, the second part includes 8 resource elements, the second part of the resource elements are located in last two OFDM symbols of the second time slot in the physical resource block pair in time domain, and are located in 4 different subcarriers in frequency domain, adjacent subcarriers in the 4 subcarriers have an interval of 2 subcarriers.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments, or make equivalent replacements to some or all technical features thereof; however, these modifications or replacements do not make the essence of corresponding technical solutions depart from the scope of the technical solutions in the embodiments of the present application.

What is claimed is:

1. A method for use at a user equipment (UE) side, the method comprising:
   receiving a UE-specified pilot signal from a network side, wherein the UE-specified pilot signal locates on resource elements of first five orthogonal frequency division multiplexing (OFDM) symbols of a time length and the time length includes 12 or 14 OFDM symbols, the resource elements of the first five OFDM symbols are 4 resource elements at each antenna port carrying the UE-specified pilot signal, and the 4 resource elements at each antenna locates on one OFDM symbol of the first five OFDM symbols of the time length;
   demodulating communication data according to the received UE-specified pilot signal.

2. The method according to claim 1, wherein the time length is numbered as 0 or 5 in case of a normal cyclic prefix (CP) or numbered as 0, 4 or 7 in case of an extended CP.

3. A user equipment (UE) side device, comprising:
   a receiver coupled to a processor, wherein the receiver is configured to:
      receive a UE-specified pilot signal from a network side, wherein the UE-specified pilot signal locates on resource elements of first five orthogonal frequency division multiplexing (OFDM) symbols of a time length and the time length includes 12 or 14 OFDM symbols, the resource elements of the first five OFDM symbols are 4 resource elements at each antenna port carrying the UE-specified pilot signal, and the 4 resource elements at each antenna locates on one OFDM symbol of the first five OFDM symbols of the time length; and
   wherein the processor is configured to demodulate communication data according to the received UE-specified pilot signal.

4. The device according to claim 3, wherein the time length is numbered as 0 or 5 in case of a normal cyclic prefix (CP) or numbered as 0, 4 or 7 in case of an extended CP.

5. A method for use at a network side, the method comprising:
   determining a user equipment (UE)-specified pilot signal locating on resource elements of first five orthogonal frequency division multiplexing (OFDM) symbols of a time length, wherein the time length includes 12 or 14 OFDM symbols, the resource elements of the first five OFDM symbols are 4 resource elements at each antenna port carrying the UE-specified pilot signal, and the 4 resource elements at each antenna locates on one OFDM symbol of the first five OFDM symbols of the time length;
   transmitting the UE-specified pilot signal.

6. The method according to claim 5, wherein the time length is numbered as 0 or 5 in case of a normal cyclic prefix (CP) or numbered as 0, 4 or 7 in case of an extended CP.

7. A network side device, comprising:
   a processor configured to determine a user equipment (UE)-specified pilot signal locating on resource elements of first five orthogonal frequency division multiplexing (OFDM) symbols of a time length, wherein the time length includes 12 or 14 OFDM symbols, the resource elements of the first five OFDM symbols are 4 resource elements at each antenna port carrying the UE-specified pilot signal, and the 4 resource elements at each antenna locates on one OFDM symbol of the first five OFDM symbols of the time length; and
   a transmitter coupled to the processor, wherein the transmitter is configured to transmit the UE-specified pilot signal.

8. The device according to claim 7, wherein the time length is numbered as 0 or 5 in case of a normal cyclic prefix (CP) or numbered as 0, 4 or 7 in case of an extended CP.

* * * * *